US012211472B2

(12) United States Patent
Li

(10) Patent No.: US 12,211,472 B2
(45) Date of Patent: Jan. 28, 2025

(54) INTELLIGENT SYSTEM FOR MATCHING AUDIO WITH VIDEO

(71) Applicant: Tzu-Hui Li, Taipei (TW)

(72) Inventor: Tzu-Hui Li, Taipei (TW)

( * ) Notice: Subject to any disclaimer, the term of this patent is extended or adjusted under 35 U.S.C. 154(b) by 200 days.

(21) Appl. No.: 17/951,133

(22) Filed: Sep. 23, 2022

(65) Prior Publication Data

US 2023/0015498 A1 Jan. 19, 2023

Related U.S. Application Data

(63) Continuation-in-part of application No. 16/749,195, filed on Jan. 22, 2020, now abandoned.

(30) Foreign Application Priority Data

Jul. 15, 2019 (TW) ................................ 108124933

(51) Int. Cl.
*G10L 15/08* (2006.01)
*G10H 1/00* (2006.01)
*G10H 1/36* (2006.01)
*G10L 15/22* (2006.01)
*G11B 27/28* (2006.01)

(52) U.S. Cl.
CPC ........... *G10H 1/368* (2013.01); *G10H 1/0008* (2013.01); *G10H 2210/056* (2013.01); *G10H 2210/071* (2013.01)

(58) Field of Classification Search
CPC ........... G10H 1/0008; G10H 2210/031; G10H 2210/036; G10H 2210/056; G10H 2210/071; G10H 2210/076; G10H 2250/311; G10L 15/08; G10L 15/22; G10L 2015/088; G11B 27/031; G11B 27/28
USPC ................ 386/278, 280, 282, 285, 239, 248
See application file for complete search history.

(56) References Cited

U.S. PATENT DOCUMENTS

2019/0087870 A1* 3/2019 Gardyne ............ H04N 21/2743
2020/0143839 A1* 5/2020 Vaucher ................. G11B 27/28
2020/0201904 A1* 6/2020 Hypen ............... H04N 21/4312

* cited by examiner

*Primary Examiner* — Daquan Zhao
(74) *Attorney, Agent, or Firm* — Ian Oglesby

(57) ABSTRACT

An intelligent system for matching audio with video of the present invention provides a video analysis module targeting color tone, storyboard pace, video dialogue, length and category and director's special requirement, actors expression, movement, weather, scene, buildings, spacial and temporal, things and a music analysis module targeting recorded music form, sectional turn, style, melody and emotional tension, and then uses an AI matching module to adequately match video of the video analysis module with musical characteristics of the music analysis module, so as to quickly complete a creative composition selection function with respect to matching audio with a video.

10 Claims, 6 Drawing Sheets

Russell's Circumplex Model

Schimmack & Grob Model

INTELLIGENT SYSTEM FOR MATCHING AUDIO WITH VIDEO

This application is a Continuation in part of application of U.S. patent application Ser. No. 16/749,195, filed on Jan. 22, 2020, currently pending.

BACKGROUND OF THE INVENTION a) Field of the Invention

The present invention relates to an intelligent system for matching audio with video, and more particularly to a music editing system for matching audio with video by means of AI matching.

b) Description of the Prior Art

For a singer, a music professional, album production personnel, single track production personnel, a record company or a media company who are concerned with providing music information, when selecting a creative composition for a produced video, it is usually up to a music professional, a video provision authority or a music application authority to select a composition, and matching audio with video is usually completed by video editing and production personnel such as an advertisement company, a movie trailer production team, a movie company, a film production student, photographer-produced photograph audio matching personnel, a theatrical company, a dance theater company, a game company, web page design music personnel, business promotion soundtrack personnel, event background music personnel, event live performance personnel, show music personnel, exhibit music personnel, interactive design music personnel, AR/VR interactive device music personnel and multimedia personnel; alternatively, the described entities who require applications of music would commission other music application units to select a composition, or commission music production/audio matching personnel, a studio, a creator, a singer, a music professional, album production personnel, single track production personnel, a record company or a media company/unit to compose music therefor. However, the described users who require music, for example, a music application authority such as a video production entity or a theatrical creation entity, often face various issues regarding music authorization. For instance, a simple act of uploading a favorite video to YouTube could result in copyright infringement and even lead to a YouTube account being deleted. When the described music information provider intends to look for audio to be matched with a video and copyright authorization, the process is extremely time consuming and will take from 8 hours to 6 months for selecting compositions, listening to the compositions and seeking authorization in order to find decent audio to be matched with the video. For a video creative composition selection unit, it would take a music application creator approximately 5 hours to select a composition each time and approximately 5 days to commission production each time, and the copyright signing process is extremely cumbersome. For a music copyright transaction unit, it would take approximately 5 hours to look for a composition each time and approximately 6 months to sign for copyright; the allocation of royalty is often not properly done in most circumstances. Therefore, for most people who seek applications of music or video creators, an issue which requires an urgent solution is to enable a composition selection time for video creation and a music copyright purchase and authorization time to be significantly reduced for a video professional matching audio with video or a theatrical company creating a play.

An intelligent system for matching audio with video is provided for enabling a unit related to seeking music authorization, such as a video production unit, a theatrical company and the like, to bypass various issues encountered while selecting a composition for video creation.

SUMMARY OF THE INVENTION

The primary object of the present invention is to provide an intelligent system for matching audio with video, which use an AI matching module to connect to a video analysis module and a music analysis module, so as to perform adequate matching between video and musical characteristics and recommend several songs for matching; if the recommended songs are not satisfactory, new recommendations of other songs can be made for matching, so as to achieve the object of quickly selecting a composition for video creation by means of intelligent matching.

DETAILED DESCRIPTION OF THE PREFERRED EMBODIMENTS

Figure 1:
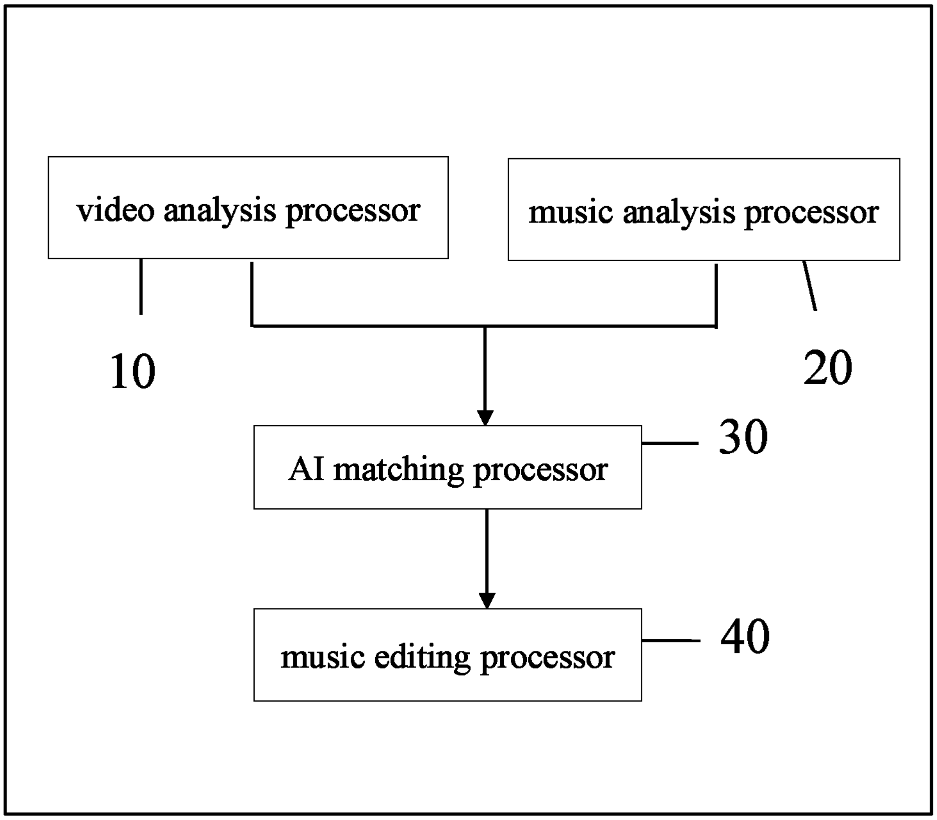
FIG. 1 shows a system block diagram according to the present invention.

Referring to FIG. 1, a software platform of the present invention comprises an input processor 110, a video analysis processor 10, a music analysis processor 20, an AI matching processor 30 and a music editing processor 40.

In the input processor 110 is responsible for providing the user to select a source file for generating image analysis signals and a file containing music analysis signals, The input processor 110 will extract the features, transform the format to compute by our software platform and computer. Through the video, the input processor 110 will cut into pieces and know what is the story, content, emotion, and background, scene happening on each scene. Also the type and style of video, such as movie, trailer, advertisement, personal, events, game etc. Based on the storyboard and timecode, the software platform can know more about the story & video's tempo. Through the images which user enter, the software platform can know the story, tone and scene they liked. Through their music preference, user can also enter the music genre, feature, tempo or the link of reference music which the software platform can download. Then, the software platform can find out the similar ones which match with their preference but also the software platform's recommendations. Software platform knows the value of different text, scripts, story between emotion, valence and arousal, and software platform is also trained by the value between different videos like movie, trailer, advertisement.

Figure 2:
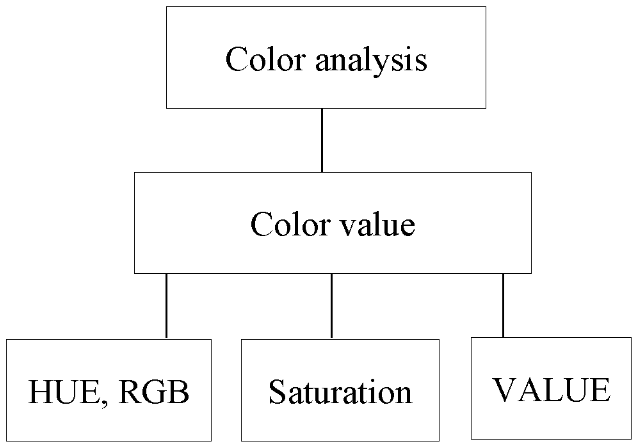
FIG. 2 shows a schematic view of color analysis in a current video analysis.

The video analysis processor 10 responsible for reading the source file selected by the user, and converting the source file into an image analysis signal corresponding to the file containing the music analysis signal selected by the user; the video analysis processor 10 is based on color tone, storyboard rhythm, video dialogue (such as storytelling or turning words, etc.), length and classification, and director's special needs and characteristics; The music analysis processor 20 is used to convert the file containing the music analysis signal into a corresponding music analysis signal and recommend to users from the database; the music editing processor 40 is responsible for editing the two files of the video analysis processor 10 and the music analysis processor 20; the AI matching processor 30 is responsible for corresponding the values between video signal which are generated by the conversion of the video analysis processor 10, and music signal which are generated by music analysis processor 20. The values are counted by the conversion from the information user input in processor 110 and the software platform algorithm. After the software platform recommends, the video and music are synthesized into one audio-visual file;

Wherein the video of the audio-visual file is the source file selected by the user through the input processor 110, and the video includes the music edited by the music editing processor 40. The video content analysis of the video analysis processor 10 includes: a color analysis, a content analysis and a character expression analysis. Referring to FIG. 2, which shows a structure of color analysis categories for analyses of color function, color value; a content analysis distinguishes who, how, when, where and what (such as a year, a location, a time, a plot and the like) based on a scene, a person, an item and lighting in a video; a character expression analysis determines an emotion of a person, a plot, a likely conversation and the like in a video according to an expression; by combining the described video content analysis, vector values of various videos can be obtained respectively. A storyboard file analysis for processing storyboard pace in the video analysis processor 10 is made according to a time point of the storyboard pace, and a mode is then input to serve as a reference for time point recording, and music and sound effect insertion points between scene switches. The storyboard file analysis obtains a time in seconds for each storyboard, which can be used to make an analysis or an on-point design on each storyboard content; a sound effect or a storyboard list in a music matching analysis of the video analysis processor 10 and the music analysis processor 20 can be used to collect an editable word (ex. doc or docx) storyboard file and a video itself in a frame-by-frame analysis. A character-based analysis related to a video dialogue in the video analysis processor 10 is made according to a video dialogue and a plot, and the video dialogue is processed to look for a storyline or delete a word of turn in speech, so as to clearly present keywords and arrange the same according to dependency (or influence), and proportionally locate a corresponding emotional parameter on average, a current Mandarin emotion dictionary is used to make a textual analysis. When the video analysis processor 10 processes a director's special requirement, a special requirement made by the director is weighted on an order of a result (a proportion of influence on the result from said factor is greater).

Figure 3:
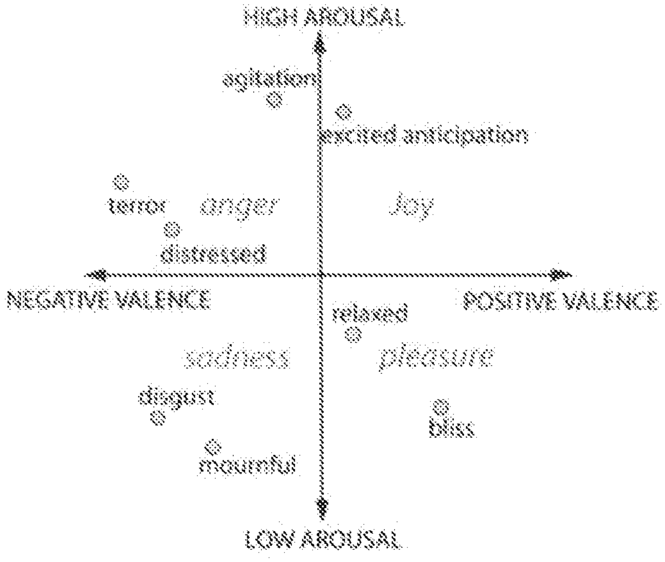
FIG. 3 shows a schematic view of emotional parameters in a current music analysis.
Figure 3:
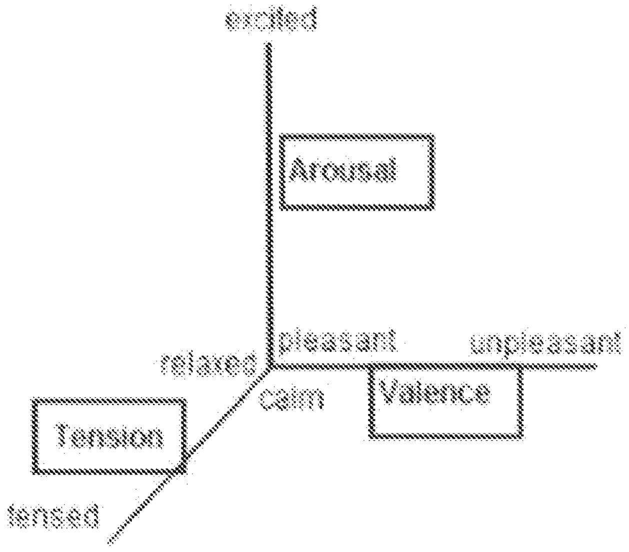

The music analysis processor 20 makes an analysis according to recorded music form, sectional turn, style, genre, melody, tempo, instrument, chord accompaniment, voice type, rhythm, volume and emotional tension; a music analysis and content of the music analysis processor 20 includes: a music property analysis, an emotion analysis and music characteristic information, wherein the music property analysis is related to an analysis of musical tone property, instrumental arrangement, music structure, rhythm, chord, chord progression, rhythm notes, pitch, scale progression, style, music form, section, phrase, lyrical phrase, genre and other music file information. Referring to FIG. 3, shows a schematic view of emotional parameters in a current music analysis, an emotional parameter (x, y) of the emotion analysis at different time points of each song is recorded by means of machine training and intelligent learning according to musical content; wherein an x axis (Valence) of the emotional parameter shows positive and negative values of emotions (a positive value indicates a positive inclination, and a negative value indicates a negative inclination), and a y axis (Arousal) of the emotional parameter shows an excitement level of an emotion. Music information is derived from a singer, a music professional, album production personnel, single track production personnel, a record company, a media company, OP, SP, a regional organization, a copyright collective management organization, a copyright, a contractual relationship, a recorded music length, a style, a file location, an open region, a streaming link, a download link, a video link, a midi file, a wav file and a mp3 file; in addition, a reference music analysis in the music analysis processor 20 is related to input preferred reference music and program, and the input reference music is used to make a music analysis to locate a title matched with an analysis result in a database.

Figure 4:
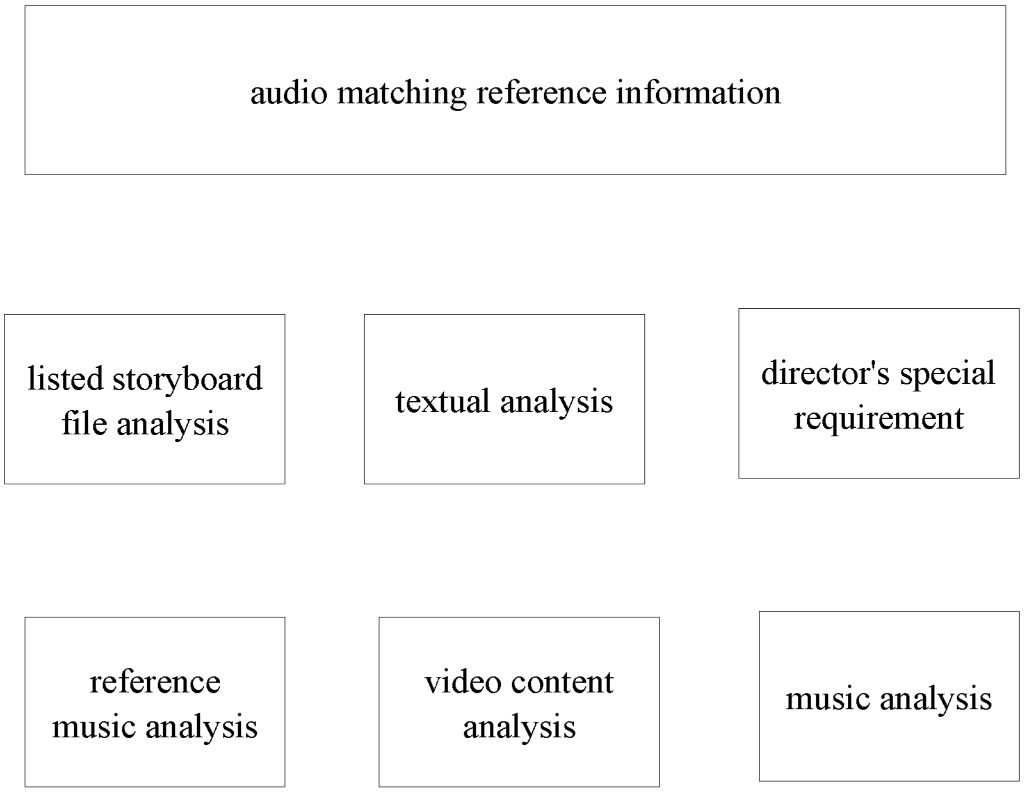
FIG. 4 shows a schematic view of audio matching reference information for an intelligent system for matching audio with video according to the present invention.

Referring to FIG. 4, shows a schematic view of audio matching reference information for an intelligent audio-video correlation platform according to the present invention, the present invention obtains a corresponding value by means of the listed storyboard file analysis, textual analysis, the director's special requirement, reference music analysis, video content analysis and music analysis, and then correspondingly matches a value of a video with music; to recommend music, the value between emotion, valence and arousal, music preference, tempo, rhythm, key, type of videos, video lengths, user preference, are all calculated; to match the value from the data we trained from movie, trailer, advertisement, algorithm will categorized the type of video first, the value of feature next, then finding the closest value & distance between the number from dataset to the user's data; to recommend the sound effects, the software platform will find the content and feature between video, images, content, movement and each sound effect value. E.g. as video analysis shows an old man wearing boots step on the wood floor slowly; the software platform will find the wood floor sound with boots step, and the sound effect will happen on the timecode from the scene with website platform player and music editing processor 40.

Figure 5:
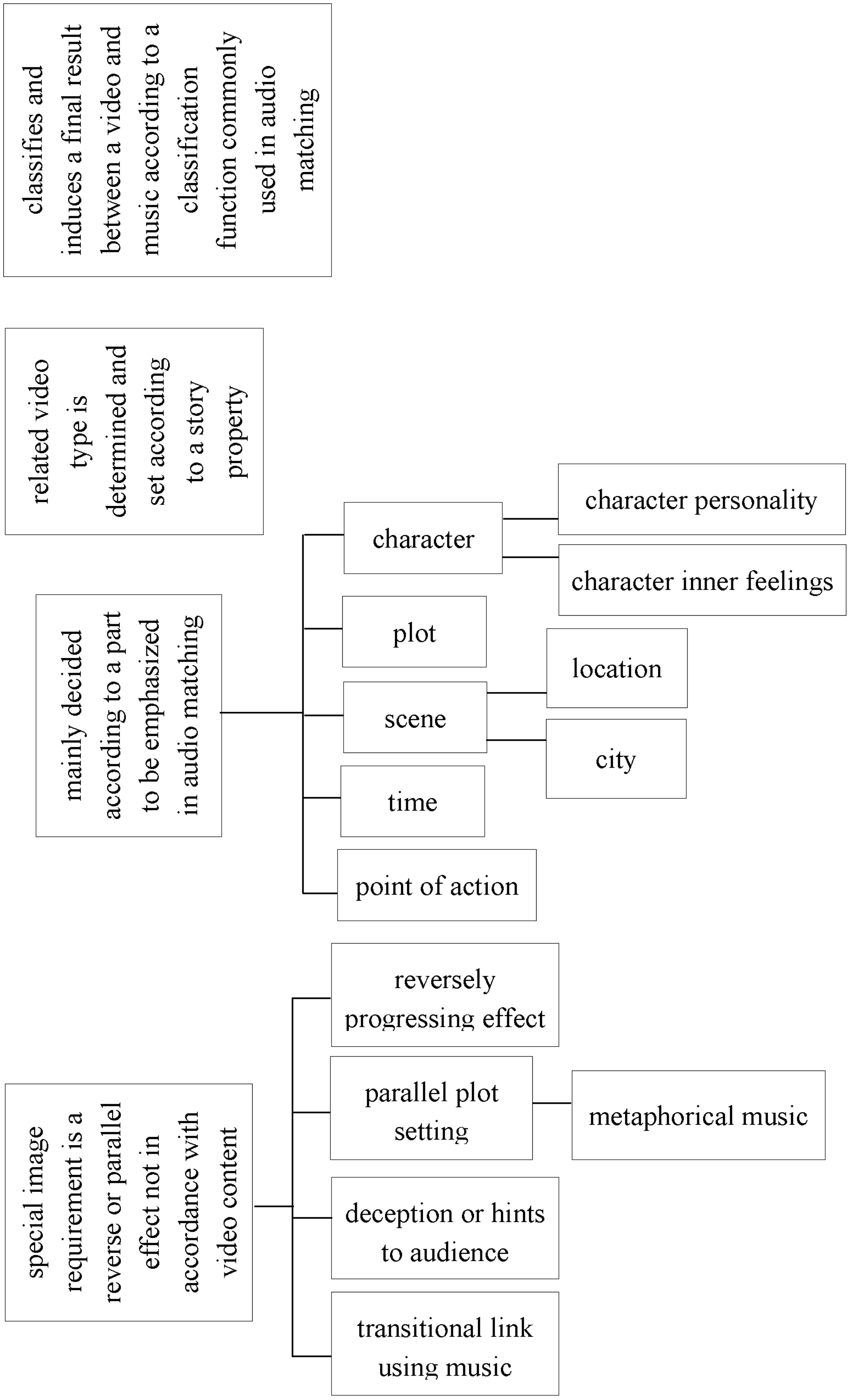
FIG. 5 shows a flow chart of audio matching modes for the intelligent system for matching audio with video according to the present invention.

Referring to FIG. 5, shows a flow chart of audio matching modes for the intelligent audio-video correlation platform according to the present invention, the present invention classifies and induces a final result between a video and music according to a classification function commonly used in audio matching, wherein a related video type is determined and set according to a story property, and is mainly decided according to a part to be emphasized in audio matching; for example, a character (including a character personality and inner feelings), a plot, a scene (including a location or a city), a time, a point of action and the like; a special picture requirement is a reverse or parallel effect not in accordance with video content, such as a reversely progressing effect, parallel plot setting (or reference music), deception or hints to audience, a transitional link using music and the like.

The present invention of the intelligent audio-video correlation platform is characterized in: an AI matching processor 30 for connecting to the video analysis processor 10 and the music analysis processor 20, so as to perform adequate matching between a video and a musical characteristic and recommend five songs for matching in practice; if the recommended songs are not satisfactory, new recommendations of other songs can be made for matching. The music editing processor 40 is connected to the AI matching processor 30, and the present invention can be used to impeccably match a time axis with an impact point between a music file and a video file by means of clip cutting and editing, music editing, music volume adjustment and sound field simulation. With regard to point-to-point matching of sound effects between the music editing processor 40 and the music analysis processor 20, in video data referred thereby, there can be more sound effects, so that an insertion point for a sound effect can be obtained by analyzing a waveform.

The video data referred to by the AI matching processor 30 trained by the present invention includes: YouTube-Movie, YouTube-movie clips and the like.

Figure 6:
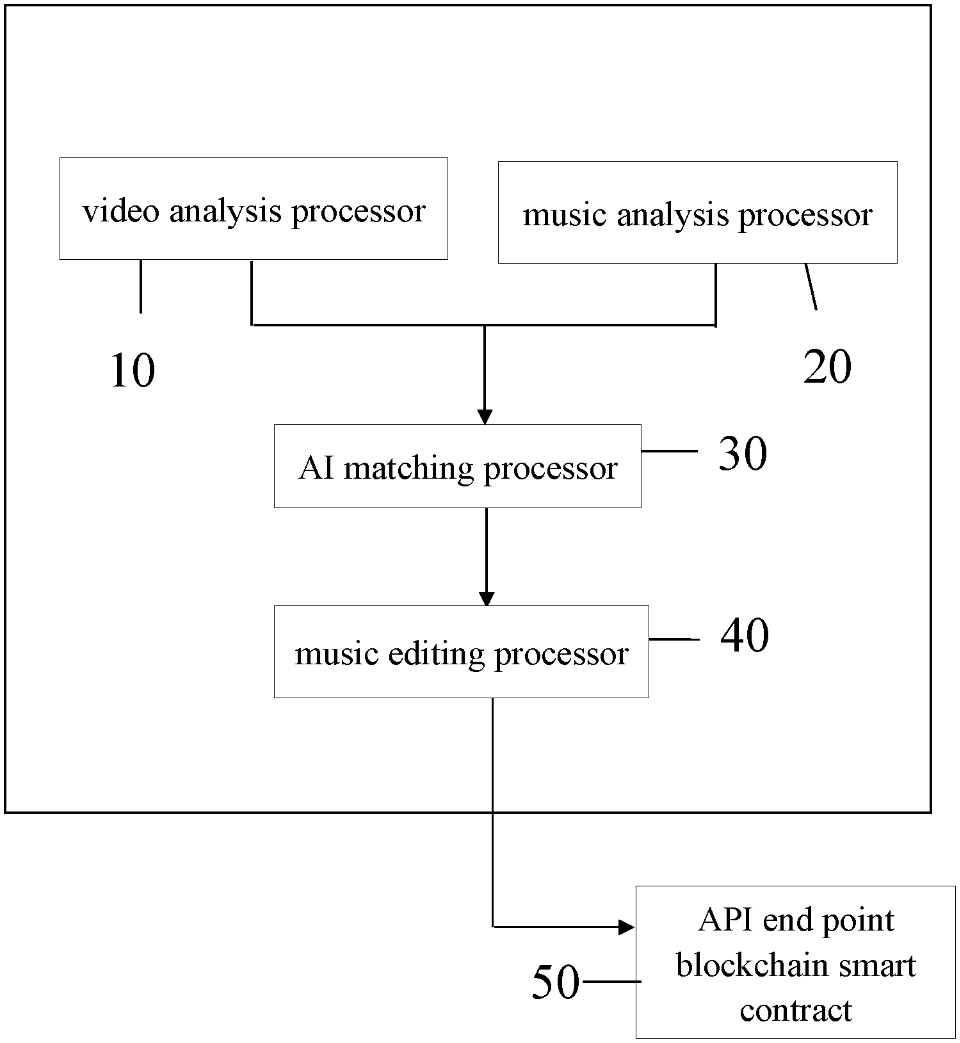
FIG. 6 shows another system block diagram according to the present invention.

Referring to FIG. 6, shows another system block diagram according to the present invention, a software platform of the present invention comprises a video analysis processor 10, a music analysis processor 20, an AI matching processor 30 and a music editing processor 40. The intelligent audio-video correlation platform of the present invention can use an API end point blockchain smart contract 50 to link to the music editing processor 40, so as to achieve freedom in use by authorization. The API end point blockchain smart contract 50 signed with a music professional can be used to collaboratively sell music to a video professional, said sell music to a video professional can also be a section or a track division, assuming that the music is from a song produced by a rock band and the song includes sounds of an electric guitar, a person, a drum or an electric bass, by using a program of the intelligent audio-video correlation platform of the present invention, music of a pure drum sound of the song, from a track of another song or from a track of an electric guitar can be mixed together with the program of the intelligent audio-video correlation platform of the present invention for processing.

A search for related keywords in a database page includes: a title, a genre, a style, a tempo, an instrument, a related keyword, an artist, an emotion, a cover photo and the like; an unique function of an audio signal is related to formats such as a mp3, a wav format or mp3 format and the like; related authorization and an order are related to commercial behaviors such as an estimated order amount based on Loop, midi and music authorization, making an order, updating an order, downloading purchased music and the like.

An algorithm of the AI matching processor 30 of the present invention includes:

a filtering and selecting mode and a scoring mode, wherein the filtering and selecting mode is within a range of standard deviation for normal distribution, so as to provide a criterion for whether to select or not, a value within a 68% confidence interval (within the error range of one standard deviation) is allowed, and a category of said filtering and selecting comprises a genre or an emotional parameter and the like. The scoring mode quantifies categories such as rhythm, instrument arrangement, chord, musical emotion (x, y), keyword emotion (x, y), director-input information, main video color tone, video content and the like, so as to calculate a score for each item for performing weighting and averaging.

In conclusion, the intelligent audio-video correlation platform of the present invention, the AI matching processor is mainly used to connect to the video analysis processor and the music analysis processor, so as to adequately match a video with a musical characteristic; after diverse logging in by a video company, selecting a video and reviewing by a director, as long as an API end point blockchain smart contract is established on the platform, a music professional, a video company and a media company are enabled to quickly complete matching audio with video.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. An intelligent audio-video correlation platform includes:

an input processor, for reading at least one source file;

a video analysis processor used to analyze a video signal of a source file, the video analysis processor is based on color tone, storyboard rhythm, video dialogue, length and classification, and the director's special needs and characteristics, among them, the analysis of the storyboard file in the image analysis processor that deals with the storyboard rhythm is based on the time point of the storyboard rhythm, then enter the mode, which is convenient for recording the time point of camera switching, music and sound effect insertion point reference, the person who processes the image dialogue in the image analysis processor analyzes the image dialogue and the script analysis, processes the image dialogue to find out the story or delete remove the turning words, make the keywords clear and arrange them according to their dependence, and find the corresponding emotional parameters on average in equal proportions;

a music analysis processor, used to convert a file containing a music analysis signal into a corresponding music analysis signal, the music analysis processor is based on the music about their recording musical form, paragraph transition, style, melody, speed, musical instrument, chord accompaniment, voice part, rhythm, volume and emotional tension; the above music analysis and content include music analysis, emotional analysis and music characteristics Information, in which the emotional analysis in the music analysis processor is based on the music content, through machine training and intelligent learning, to record the emotional parameters (x, y) of each song at different time points, and the x-axis of the emotional parameters is the numerical value of the positive emotion, and the y-axis of the emotional parameter is the degree of agitation of the negative emotion;

a music editing processor, which is used to edit the files of the video analysis processor and the music analysis processor, the music editing processor combines the time of the two files of music and video through video editing, music clipping series, music timing, music volume, audio panning, audio effects and mixing, sound field simulation, the axis and the hit point are completely aligned;

an AI matching processor, which is connected to the video analysis processor, a music analysis processor and music editing processor, use image and music features to make appropriate matching, to synchronize an audio-visual file, among them, the screening method of the AI matching processor is within the range of the standard deviation of the normal distribution, giving the standard of screening or not, and its value within the 68% confidence level within an error range of one standard deviation is allowed, the categories to be screened include musical style or emotional parameters, the scoring method of the AI matching processor is based on rhythm, instrument arrangement, chord, musical emotion (x, y), keyword emotion (x, y), director input information, video quantify content such as main color and image content, and calculate the score of each item as a weighted average.

2. The intelligent audio-video correlation platform according to claim 1, wherein the video analysis processor comprises an analysis of a color function and a color value in a movie, a color analysis of a structure of color analysis categories, a content analysis of a scene, a person, an item and lighting for distinguishing who, how, when, where and what in a video, and a character expression analysis for determining an emotion, a plot and a likely conversation of characters in a video according to an expression.

3. The intelligent audio-video correlation platform according to claim 1, wherein the video analysis processor has a storyboard file analysis for processing a storyboard pace according to a time point of the storyboard pace, and then a mode is input to serve as a reference for time point recording, music and sound effect insertion points between scene switches.

4. The intelligent audio-video correlation platform according to claim 1, wherein the video analysis processor has a character-based analysis handling a video dialogue according to a video dialogue and plot analysis, and processes the video dialogue to look for a storyline or delete a word of turn in speech, so as to clearly present a keyword and arrange the same according to dependency, and proportionally locate a corresponding emotional parameter on average.

5. The intelligent audio-video correlation platform according to claim 1, wherein the music analysis processor has a music property analysis for analyzing musical tone property, instrumental arrangement structure, rhythm, chord, chord progression, rhythm pitch, scale progression, style, music form, section, phrase, lyrical phrase, genre and other music file information.

6. The intelligent audio-video correlation platform according to claim 1, wherein the music analysis processor has an emotion analysis for recording an emotion parameter (x, y) at different time points of each song by means of machine training and intelligent learning according to musical content, wherein an x axis (Valence) of the emotional parameter shows a value of a positive emotion and a y axis (Arousal) of the emotional parameter shows an excitation level of a negative emotion.

7. The intelligent audio-video correlation platform according to claim 1, wherein the music analysis processor has music characteristic information derived from a singer, a music professional, album production personnel, single track production personnel, a record company, a media company, OP, SP, a regional organization, a copyright collective management organization, a copyright, a contractual relationship, a recorded music length, a style, a file location, an open region, a streaming link, a download link, a video link, a midi file, a wav file and a mp3 file.

8. The intelligent audio-video correlation platform according to claim 1, wherein an algorithm of the AI matching processor includes: a filtering and selecting mode and a scoring mode and a editing mode.

9. The intelligent audio-video correlation platform according to claim 8, wherein the filtering and selecting mode is within a range of standard deviation for normal distribution, so as to provide a criterion for whether to select or not, a value within a 68% confidence interval (within the error range of one standard deviation) is allowed, and a category of said filtering and selecting comprises a genre or an emotional parameter and the like.

10. The intelligent audio-video correlation platform according to claim 8, wherein the scoring mode quantifies categories such as rhythm, instrument arrangement, chord, musical emotion (x, y), keyword emotion (x, y), director-input information, main video color tone, video content and the like, so as to calculate a score for each item for performing weighting and averaging.

* * * * *